(12) United States Patent
Andoh

(10) Patent No.: US 8,175,804 B2
(45) Date of Patent: May 8, 2012

(54) NAVIGATION APPARATUS

(75) Inventor: Junichi Andoh, Toyota (JP)

(73) Assignee: Denso Corporation, Kariya (JP)

( * ) Notice: Subject to any disclaimer, the term of this patent is extended or adjusted under 35 U.S.C. 154(b) by 273 days.

(21) Appl. No.: 12/654,085

(22) Filed: Dec. 10, 2009

(65) Prior Publication Data

US 2010/0191451 A1 Jul. 29, 2010

(30) Foreign Application Priority Data

Jan. 26, 2009 (JP) ................................. 2009-14644

(51) Int. Cl.
*G01C 21/00* (2006.01)
(52) U.S. Cl. ......................... 701/430; 701/444; 711/162
(58) Field of Classification Search .................. 701/200, 701/430, 444; 711/E12.103, 162
See application file for complete search history.

(56) References Cited

U.S. PATENT DOCUMENTS

| | | | | |
|---|---|---|---|---|
| 7,974,959 | B2 * | 7/2011 | Sawai et al. .................... | 707/695 |
| 2004/0102897 | A1 * | 5/2004 | Watanabe et al. ............. | 701/208 |
| 2005/0114016 | A1 * | 5/2005 | Kim et al. ...................... | 701/208 |
| 2008/0222546 | A1 * | 9/2008 | Mudd et al. .................... | 715/765 |
| 2008/0270025 | A1 * | 10/2008 | Wlotzka ......................... | 701/207 |
| 2009/0327071 | A1 * | 12/2009 | Kreft ............................. | 705/14.49 |

FOREIGN PATENT DOCUMENTS

| | | |
|---|---|---|
| EP | 1 267 261 | 12/2002 |
| JP | A-2004-013299 | 1/2004 |
| JP | A-2006-162349 | 6/2006 |
| JP | A-2007-034754 | 2/2007 |
| JP | A-2008-191016 | 8/2008 |
| WO | WO 2009/132680 | 11/2009 |

OTHER PUBLICATIONS

Search Report dated May 10, 2010 issued in the corresponding Great Britain patent application No. 1000472.9.

* cited by examiner

*Primary Examiner* — Helal A Algahaim
(74) *Attorney, Agent, or Firm* — Posz Law Group, PLC

(57) ABSTRACT

A navigation program is prepared for a navigation apparatus so as to be used in several different destination regions. When installing a navigation program, which is stored in a portable storage medium, into a memory device of a navigation apparatus, it is determined that a destination region of a navigation program currently recorded in the memory device is different from that of the portable storage medium. In such cases, not only the navigation program but also point registration information and contents data currently recorded in the memory device are erased; the navigation program is acquired from the portable storage medium and recorded in the memory device. Furthermore, user's setting information recorded in the memory device is erased while returning setting contents of the various functions to default states.

15 Claims, 3 Drawing Sheets

DATA STRUCTURE OF NAVI PROGRAM (PGM)

DEST. R. INFO/VER. INFO OF NAVI PROGRAM (PGM)

NAVIGATION APPARATUS

CROSS REFERENCE TO RELATED APPLICATION

The present application is based on and incorporates herein by reference Japanese Patent Application No. 2009-14644 filed on Jan. 26, 2009.

FIELD OF THE INVENTION

The present invention relates to a technology used in a navigation apparatus, the technology certainly erasing user information currently recorded in the navigation apparatus in case when installing a navigation program for a destination region different from that of a navigation program currently recorded.

BACKGROUND OF THE INVENTION

[Patent document 1] JP-2006-162349 A

There is known a navigation apparatus provided with navigation functions, such as a route guidance function to retrieve a route to a target travel end point (so-called a destination) and perform a route guidance based on the retrieved route.

Patent document 1 describes such a navigation apparatus, in which a recording means such as a built-in hard disk drive records a navigation program, and a controlling means such as a CPU reads and executes the navigation program in the recording means to thereby realize the above navigation function.

It is noted that the hardware section of the navigation apparatus differs in specifications according to destination regions. The destination region can be also referred to as a used region, signifying a region, in which the navigation apparatus is shipped to and practically used in. The specifications according to destination regions include, for instance, domestic (Japan) specification, North America specification, and Europe specification. Further, similarly to the hardware section, the navigation program of the navigation apparatus differs in specifications according to the above destination regions or used regions, such as domestic (Japan) specification, North America specification, and Europe specification. The navigation program for the same destination region as that of the hardware section is thus recorded in the recording means for each navigation apparatus at the time of manufacturing.

In this regard, however, the above navigation apparatus has the following disadvantage. That is, there may be a case that a vehicle equipped with the above navigation apparatus is distributed as a used car as being destined for a destination region different from the initially intended destination region. In such a case, it is necessary to prevent the disclosure of personal information or user information, which is related with a user having used until then the vehicle or navigation apparatus. The user information includes, for instance, a registered point such as home, and the history record of the target travel end points. That is, the user information is required to be erased from the recording means of the navigation apparatus before reaching the next user. Such erasure of the user information may be sometimes missed because of lapse of memory of the user till then or the distributor.

SUMMARY OF THE INVENTION

The present invention is made in consideration of such a disadvantage. It is an object to provide a technology that more certainly erases user information recorded until then in a navigation apparatus when installing a navigation program for a different destination region.

To achieve the above object, according to an example of the present invention, a navigation apparatus is provided as follows. A recording device is configured to record a navigation program and user information on user, the navigation program recorded in the recording device including destination region information on destination region and version information on version. A reading device is configured to read a navigation program stored in a portable storage medium, the navigation program stored in the portable storage medium including destination region information on destination region and version information on version. A control circuit is configured to execute a navigation function by reading and executing the navigation program recorded in the recording device, and to execute a program recording process and a backing up process, the program recording process and the backing up process being allowed to be performed in parallel. Herein, the program recording process is to read the navigation program in the portable storage medium via the reading device and record the read navigation program in the recording device; the backing up process is to back up the user information recorded in the recording device. In the control circuit, a destination region comparison section is configured to execute a destination region comparison to compare the destination region of the navigation program stored in the portable storage medium with the destination region of the navigation program recorded in the recording device. Wherein, when the destination region of the navigation program stored in the portable storage medium is different from the destination region of the navigation program recorded in the recording device, the program recording process is executed while executing a user information easing process to erase the user information currently recorded in the recording device without executing the backing up process. In the control circuit, a version comparison section is further configured to execute a version comparison to compare the version of the navigation program stored in the portable storage medium with the version of the navigation program recorded in the recording device when the destination region of the navigation program stored in the portable storage medium is identical to the destination region of the navigation program recorded in the recording device. Herein, when the version of the navigation program stored in the portable storage medium is newer than the version of the navigation program recorded in the recording device, the program recording process is executed while the backing up process is executed.

According to thus configured navigation apparatus, the user information recorded until then in the recording device of the navigation apparatus can be more certainly erased when installing a navigation program for a different destination region.

According to another example of the present invention, a method for recording a navigation program assigned with a destination region is provided in a navigation apparatus. The navigation apparatus includes a recording device configured to record a navigation program and user information on user, the navigation program recorded in the recording device including destination region information on destination region and version information on version; a reading device configured to read a navigation program stored in a portable storage medium, the navigation program stored in the portable storage medium including destination region information on destination region and version information on version; and a control circuit configured to execute a navigation function by reading and executing the navigation program recorded in the recording device, and to execute a program recording process and a backing up process, the program recording process and the backing up process being allowed to be performed in parallel. Herein, the program recording process reading the navigation program in the portable storage medium via the reading device and recording the read navigation program in the recording device; the backing up process to back up the user information recorded in the recording device. The method comprises: executing a destination region determination as to whether the destination region of the navigation program stored in the portable storage medium is identical to the destination region of the navigation program recorded in the recording device; executing a version determination as to whether the version of the navigation program stored in the portable storage medium is newer than the version of the navigation program recorded in the recording device when it is determined that the destination region of the navigation program stored in the portable storage medium is identical to the destination region of the navigation program recorded in the recording device; executing the program recording process while executing a user information easing process to erase the user information currently recorded in the recording device without executing the backing up process, when it is determined that the destination region of the navigation program stored in the portable storage medium is not identical to the destination region of the navigation program recorded in the recording device; and executing the program recording process while executing the backing up process, when it is determined that the version of the navigation program stored in the portable storage medium is newer than the version of the navigation program recorded in the recording device.

According to yet another example of the present invention, a computer-readable program storage medium is provided as comprising instructions for execution by a computer, the instructions including the above method being computer-implemented for the navigation apparatus.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment according to the present invention will be explained with reference to drawings. In addition, the embodiment of the present invention can be modified in various manners within a technical scope of the present invention without being limited to the following embodiment.

Figure 1:
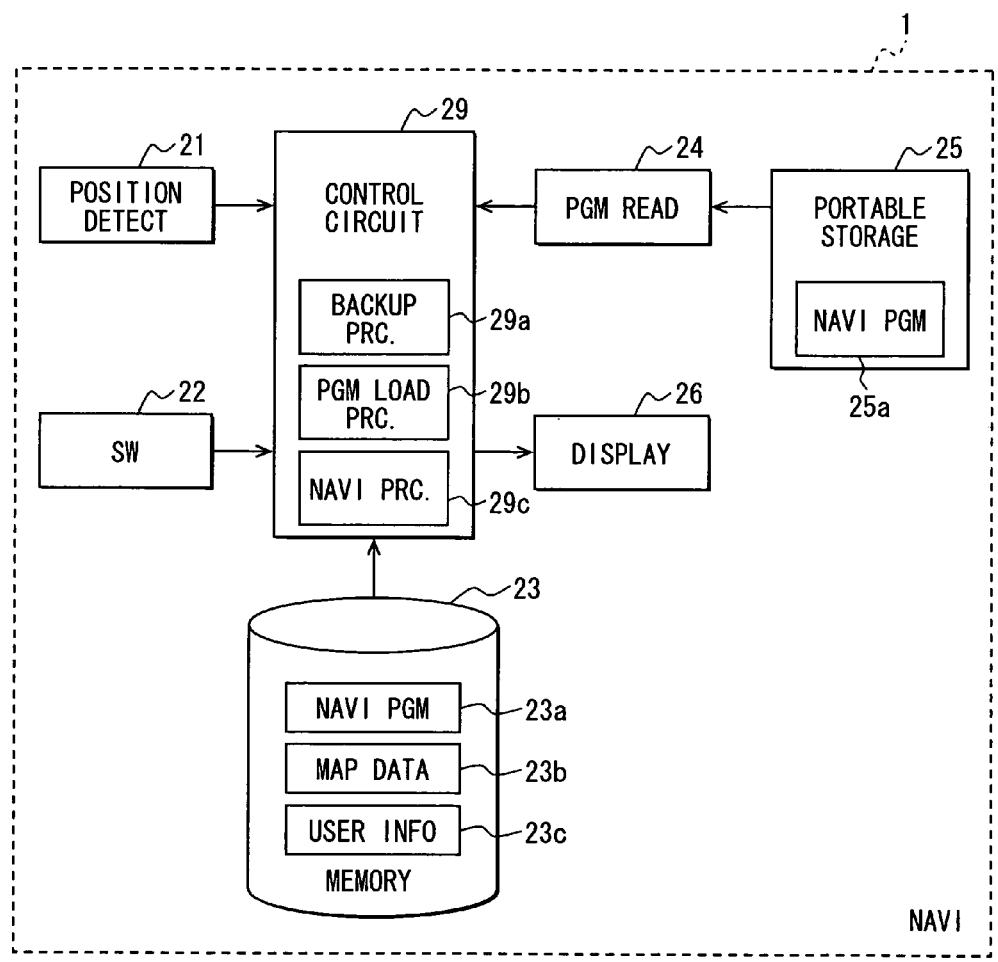
FIG. 1 is a block diagram illustrating a configuration of a navigation apparatus according to an embodiment of the present invention.

The embodiment of the present invention is directed to a navigation apparatus 1 mounted in a subject vehicle. As illustrated in FIG. 1, the navigation apparatus include the following: a position detection device 21 for detecting a present position of the vehicle (i.e., a position where the vehicle is presently located); an operation switch group 22 for inputting various instructions from a user; a memory device 23 as a recording device for storing the various data; a program reading device 24 for inputting data stored in various storage media; a display device 26 for displaying a map or a variety of information; and a control circuit (also referred to a control means, device, or section) 29 for controlling the foregoing components or the like.

The position detection device 21 includes the following sensors or the like: a GPS receiver, which receives via a GPS antenna (not shown) electric waves from satellites for GPS (Global Positioning System) and is used for detecting a position, orientation, or speed of the subject vehicle; a gyroscope which detects rotational movement exerted over the vehicle; a distance sensor which detects a travel distance of the vehicle from an acceleration in a front-and-back direction of the vehicle; and a geomagnetic sensor which detects a heading direction or orientation of the vehicle by geomagnetism. The individual sensors or the like have different types of detection errors from each other; therefore, they are used to complement each other.

The operation switch group 22 includes a mechanical key switch arranged in the circumference of the screen of the display device 26 and a touch sensitive panel integrated into a surface of the screen on the display device 26. The touch panel and the display device 26 are laminated integrally. In addition, although the touch panel includes various types to detect a user's manipulation such as a pressure-sensitive type, an electromagnetic induction type, a capacitive sensing type, or a type combining the foregoing, any type may be used in the present embodiment.

The memory device 23 stores a navigation program 23a for realizing a navigation function (also referred to as a navigation process), map data 23b, user information 23c, etc.

Figure 2A:
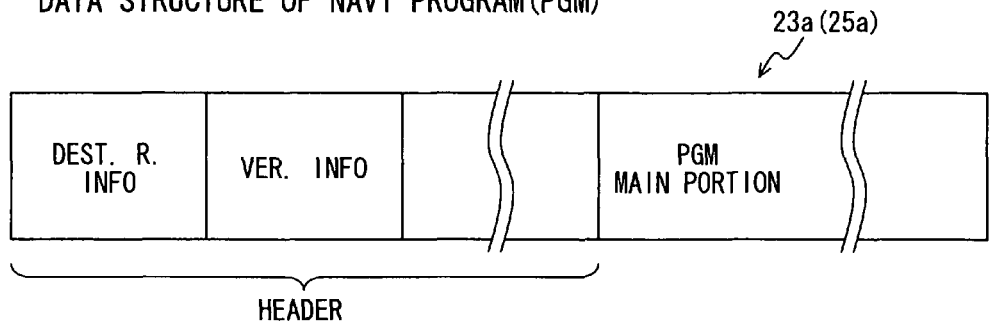
FIG. 2A is a diagram illustrating an example of data structure of a navigation program.

The navigation program 23a is, for instance, a software program executed by the control circuit 29 to thereby achieve the navigation function or process. As illustrated in FIG. 2a, the navigation program 23a (or 25a) includes destination information and version information as well as a program main portion. The destination information indicates a region (i.e., destination region or used region), in which the navigation program is practically used, or for which the intended initial shipment of the navigation apparatus 1 from the manufacture or the like is destined. The version information indicates a version of the navigation program itself.

Figure 2B:
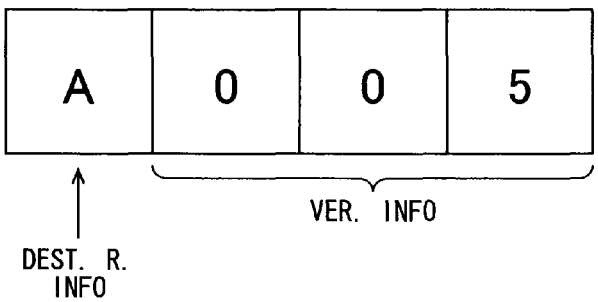
FIG. 2B is a diagram illustrating an example of data structure including destination information and version information.

Furthermore, for instance, the destination region includes Japan, North America, whole Europe, Russia, Australia, etc., which is represented by a single alphabetic character in the present embodiment. For instance, Japan (domestic) is represented by "A"; North America is "B"; whole Europe is "C"; Russia is "E"; and Australia is "F." In addition, the version information is expressed in the triple digits of numeral characters in the present embodiment. The destination region information and the version information are stored as a character string of the four digits, for instance, in a header portion of the navigation program 23a (or 25a) (refer to FIG. 2B).

In addition, the user information (23c) is relative to a user, for example, including point registration information, user setting information, contents data, etc. The point registration information indicates a position or point, which is designated by the user as a departure point or a destination (i.e., target travel end point), thus including information indicating a position of home of the user and a historical records of destinations (i.e., destination history), etc. In addition, the user setting information indicates contents of settings designated or inputted by the user against the default or initial states of the settings (i.e., the contents of the settings) of the various functions including a navigation function, such as settings of ON or OFF of the audio function, etc. Furthermore, the user setting information also includes setting information for the various functions of the executions taking place in the subject vehicle where the navigation apparatus 1 is mounted, as well as those for the navigation apparatus 1. This is because such setting contents relative to the subject vehicle itself can be received and transmitted via an in-vehicle local area network (LAN) (not shown). In addition, the contents data include audio data, image data, or photograph data, etc, which can be used by the user using the various constituent devices of the navigation apparatus 1 or other constituent devices of the subject vehicle.

Furthermore, the memory device 23 may function as a recording means, section, or device.

The program reading device 24 is used for inputting or installing the navigation program stored in a portable storage medium 25. It is noted that the navigation program 25*a* stored in the portable storage medium 25 includes the destination region information, the version information, the program main portion, etc., like that of the memory device 23 (refer to FIGS. 2A, 2B).

Furthermore, the program reading device 24 may function as a reading means, section, or device.

The display device 26 is a color display screen and can be a liquid crystal display, an organic electroluminescence display, or a CRT, or the like. The display device 26 displays a map and associated data in superimposition. The associated data include a present position mark indicating a present position of the vehicle, which is specified from a present position detected by the position detection device 21 and the map data inputted from the map data 23*b* of the memory device 23; a guidance route to a target travel end point (i.e., destination); names, landmarks, facility marks, etc., further displaying guidance information of the facilities.

The control circuit 29 has a CPU, a memory including a ROM and a RAM, I/O (input/output interface), and a bus connecting the preceding components, and achieves the various functions by executing various processes based on the program stored in the RAM or RAM.

Figure 2C:
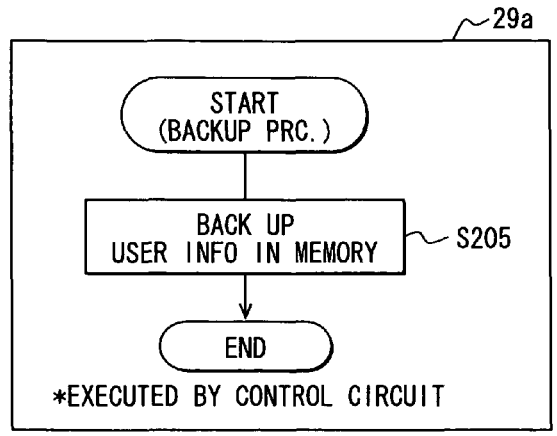
FIG. 2C is a flowchart diagram illustrating a back-up process executed by a control circuit of the navigation apparatus.

In addition, the control circuit 29 realizes the navigation function 29*c* (i.e., navigation process) by reading and executing the navigation program stored in the memory device 23. For instance, such navigation function or process 29*c* includes a map display process and a route guidance process. In the map display process, based on each detection signal from the position detection device 21, a present position of the vehicle is calculated as a pair of coordinates and a heading direction; a map near the present position is read from the memory device 23; and the read map is displayed in the display device 26. In the route guidance process, an optimal route is calculated from the present position to the target travel end point or position (i.e., destination) based on the point data stored in the memory device 23, and the destination designated via the manipulation of the operation switch group 22. In addition, the control circuit 29 can execute a backup process (also referred to as a backup control, or a backing up process) 29*a* in FIG. 2C, which backs up the user information (23*c*) stored or recorded in the memory device 23, and a program load process 29*b* mentioned later in parallel to the other processes.

Furthermore, the control circuit 29 function as a control means, section, or device.

Here, the navigation apparatus 1 and other configuration use a well-known technology; therefore, a detailed explanation is omitted herein.

Figure 3:
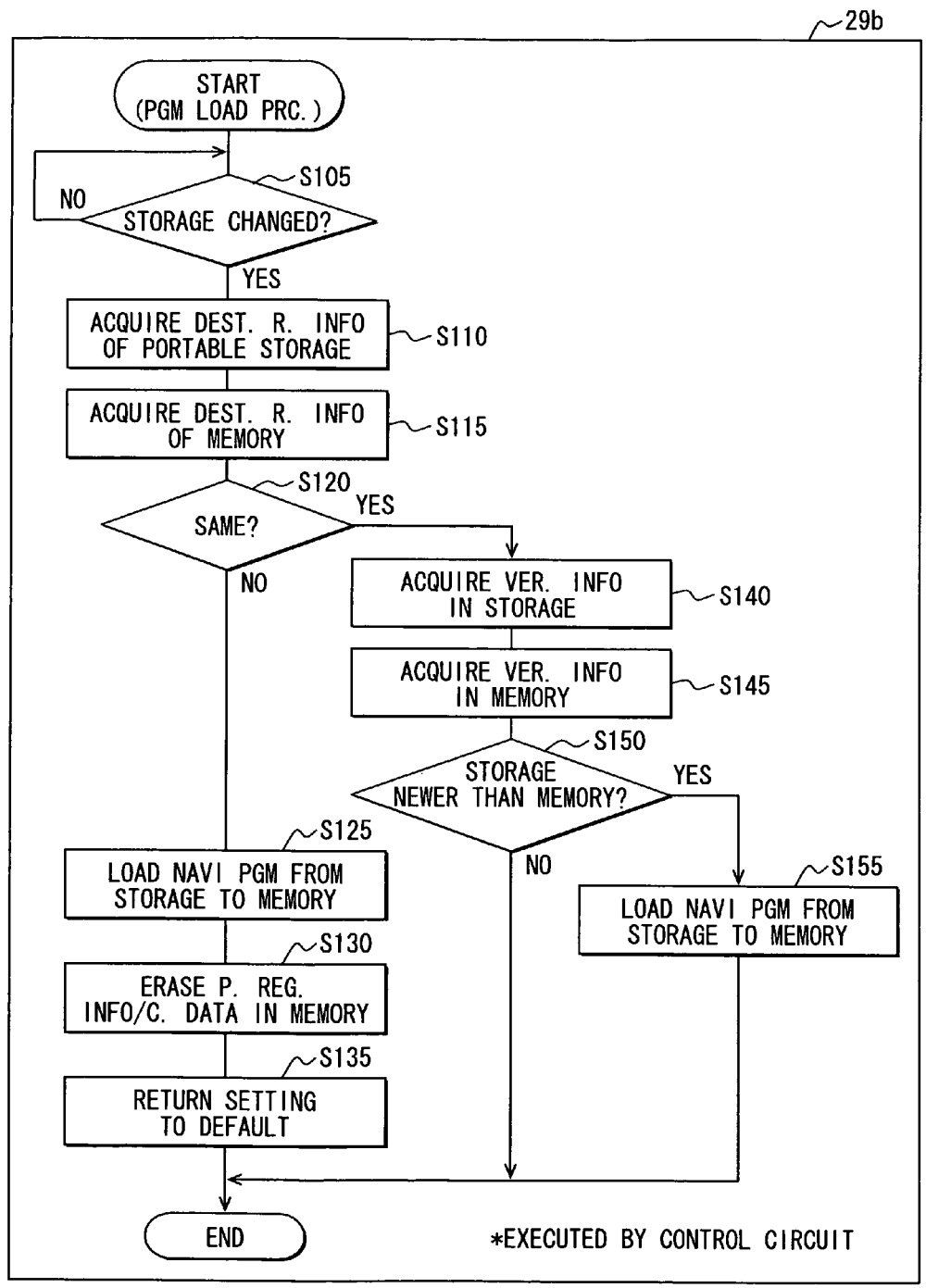
FIG. 3 is a flowchart diagram illustrating a program load process executed by the control circuit.

Next, a program load process 29*b* which the control circuit 29 executes is explained, while referring to the flowchart of FIG. 3.

The present process is repeatedly executed independently from other processes which the control circuit 29 executes.

It is noted that a flowchart or the processing of the flowchart in the present application includes sections (also referred to as steps), which are represented, for instance, as S100. Further, each section can be divided into several sub-sections while several sections can be combined into a single section. Furthermore, each of thus configured sections can be referred to as a means and achieved not only as a software section but also as a hardware section.

Returning to FIG. 3, first, at S105, it is determined whether the portable storage medium 25 being inserted into the program reading device 24 is substituted. When it is determined at S105 that the portable storage medium 25 is not substituted, the processing stands by until the portable storage medium is replaced. When it is determined at S105 that the portable storage medium 25 is substituted, the destination region information of the navigation program 25*a* stored in the portable storage medium 25 is acquired through controlling the program reading device 24 at S110. Furthermore, the destination region information of the navigation program 23*a* stored in the memory device 23 is acquired at S115.

Then, the destination region information of the navigation program 25*a* stored in the portable storage medium 25 is compared with the destination region information of the navigation program 23*a* recorded or stored in the memory device 23, thereby determining whether both are the same at S120. As explained above, S120 can be referred to as a destination region comparison section.

When the destination region information of the navigation program 25*a* stored in the portable storage medium 25 is different from the destination region information of the navigation program 23*a* stored in the memory device 23 (S120: NO), the processing advances to S125, where the following takes place. The navigation program 23*a* currently recorded in the memory device 23 is deleted; the navigation program 25*a* stored in the portable storage medium 25 is acquired by controlling the program reading device 24; and the acquired navigation program 25*a* is recorded in the memory device 23. Furthermore, the processing at S125 can be referred to as a program recording process (i.e., a program recording control).

Further, the following processing is executed in order not to leave the user information (23*c*) in the navigation apparatus 1. That is, the point registration information included in the user information (23*c*) currently recorded in the memory device 23 and contents data are erased or deleted from the memory device 23 at S130. The user setting information included in the user information (23*c*) currently recorded in the memory device 23 is then erased or deleted from the memory device 23, thereby returning the setting contents of the various functions to the default or initial states at S135. Furthermore, the processing at S130 and S135 can be also referred to as a user information erasing process (also referred to as a user information erasing control). In addition, the backup process 29*a*, which backs up the user information (23*c*) recorded or stored in the memory device 23 (see FIG. 2C), can be executed apart from the present program load process 29*b*. In cases that executing the user information erasing process at S130, S135, the backup process 29*a* is not executed. The present program load process 29*b* is then ended.

In contrast, when the destination region information of the navigation program 25*a* stored in the portable storage medium 25 is the same as the destination region information of the navigation program 23*a* recorded or stored in the memory device 23 (S120: YES), the processing advances to S140, where the following takes place. The version information of the navigation program 25*a* stored in the portable storage medium 25 is acquired through controlling the program reading device 24 at S140. Furthermore, the version information of the navigation program 23*a* recorded or stored in the memory device 23 is acquired at S145.

Then, the version information of the navigation program 25*a* stored in the portable storage medium 25 is compared with the version information of the navigation program 23*a* recorded or stored in the memory device 23, thereby determining whether both are the same at S150. As explained above, S150 can be referred to as a version comparison section.

Then, when the version information of the navigation program 25*a* stored in the portable storage medium 25 is newer than the version information of the navigation program 23*a* recorded or stored in the memory device 23 (S150: YES), the processing advances to S155, where the following takes place. The navigation program 23*a* currently recorded in the memory device 23 is erased or deleted; the navigation program 25*a* stored in the portable storage medium 25 is acquired by controlling the program reading device 24; and the acquired navigation program 25*a* is recorded in the memory device 23 at S155. Furthermore, the processing at S155 can be also referred to as a program recording process (i.e., a program recording control), like S125. Furthermore, the above user information erasing process is not executed in this case. At this time, the backup process 29*a* (refer to FIG. 2C) is executed apart from present program load process in anticipation or preparation for the situation which the user information (23*c*) is erased incorrectly; namely, the user information (23*c*) is backed up so as to prevent incorrect erasure from occurring. In the backup process 29*a*, the user information (23*c*) recorded or stored in the memory device 23 is backed up in a predetermined recording area in the memory device 23 at S205. Furthermore, the user information (23*c*) can be also or otherwise backed up in the memory (e.g., ROM) in the control circuit 29. The present program load process 29*b* is then ended.

According to the navigation apparatus 1 of the present embodiment, the following can be achieved. First, the navigation program 23*a*, which is for a destination region, is currently recorded or stored in the built-in memory device 23 for achieving the navigation function. The navigation program 25*a* stored in the portable storage medium 25 is read out and recorded in the memory device 23, while the navigation program 25*a* is for a destination region different from that of the navigation program 23*a* currently stored in the memory device 23. In such a case, the user information (23*c*) currently recorded in the memory device 23 can be erased certainly, thereby helping prevent the disclosure or leakage of the personal information. It is noted that a flowchart or the processing of the flowchart in the present application includes sections (also referred to as steps), which are represented, for instance, as S100.

Aspects of the disclosure described herein are set out in the following clauses.

As an aspect of the disclosure, a navigation apparatus is provided as follows. A recording device is configured to record a navigation program and user information on user, the navigation program recorded in the recording device including destination region information on destination region and version information on version. A reading device is configured to read a navigation program stored in a portable storage medium, the navigation program stored in the portable storage medium including destination region information on destination region and version information on version. A control circuit is configured to execute a navigation function by reading and executing the navigation program recorded in the recording device, and to execute a program recording process and a backing up process, the program recording process and the backing up process being allowed to be performed in parallel. Herein, the program recording process is to read the navigation program in the portable storage medium via the reading device and record the read navigation program in the recording device; the backing up process is to back up the user information recorded in the recording device. In the control circuit, a destination region comparison section is configured to execute a destination region comparison to compare the destination region of the navigation program stored in the portable storage medium with the destination region of the navigation program recorded in the recording device. Wherein, when the destination region of the navigation program stored in the portable storage medium is different from the destination region of the navigation program recorded in the recording device, the program recording process is executed while executing a user information easing process to erase the user information currently recorded in the recording device without executing the backing up process. In the control circuit, a version comparison section is further configured to execute a version comparison to compare the version of the navigation program stored in the portable storage medium with the version of the navigation program recorded in the recording device when the destination region of the navigation program stored in the portable storage medium is identical to the destination region of the navigation program recorded in the recording device. Herein, when the version of the navigation program stored in the portable storage medium is newer than the version of the navigation program recorded in the recording device, the program recording process is executed while the backing up process is executed.

According to thus configured navigation apparatus, the user information recorded until then in the recording device of the navigation apparatus can be more certainly erased when installing a navigation program for a different destination region.

As an optional aspect of the navigation apparatus, the user information may include point registration information which indicates a spot designated by the user as a departure point or an end point (i.e., a destination) when executing a navigation process. The control circuit may be further configured to execute an erasure to erase the contents data as the point registration information when executing the user information erasing process.

As an optional aspect of the navigation apparatus, the user information may include user setting information, which indicates setting contents set up by the user against a default state with respect to functions including the navigation function. The control circuit may be further configured to execute an erasure to erase as the user information the recorded setting contents set up by the user while returning the setting information of the functions to the default state, when executing the user information erasing process.

As an optional aspect of the navigation apparatus, the user information may include contents data registered by the user. The control circuit may be further configured to execute an erasure to erase the contents data as the user information when executing the user information erasing process.

As an optional aspect, the navigation apparatus may be mounted in a vehicle.

According to another aspect of the disclosure, a method for recording a navigation program assigned with a destination region is provided in a navigation apparatus. The navigation apparatus includes a recording device configured to record a navigation program and user information on user, the navigation program recorded in the recording device including destination region information on destination region and version information on version; a reading device configured to read a navigation program stored in a portable storage medium, the navigation program stored in the portable storage medium including destination region information on destination region and version information on version; and a control circuit configured to execute a navigation function by reading and executing the navigation program recorded in the recording device, and to execute a program recording process and a backing up process, the program recording process and the backing up process being allowed to be performed in parallel. Herein, the program recording process reading the navigation program in the portable storage medium via the reading device and recording the read navigation program in the recording device; the backing up process to back up the user information recorded in the recording device. The method comprises: executing a destination region determination as to whether the destination region of the navigation program stored in the portable storage medium is identical to the destination region of the navigation program recorded in the recording device; executing a version determination as to whether the version of the navigation program stored in the portable storage medium is newer than the version of the navigation program recorded in the recording device when it is determined that the destination region of the navigation program stored in the portable storage medium is identical to the destination region of the navigation program recorded in the recording device; executing the program recording process while executing a user information easing process to erase the user information currently recorded in the recording device without executing the backing up process, when it is determined that the destination region of the navigation program stored in the portable storage medium is not identical to the destination region of the navigation program recorded in the recording device; and executing the program recording process while executing the backing up process, when it is determined that the version of the navigation program stored in the portable storage medium is newer than the version of the navigation program recorded in the recording device.

According to yet another aspect of the disclosure, a computer-readable program storage medium is provided as comprising instructions for execution by a computer, the instructions including the above method being computer-implemented for the navigation apparatus.

Such a program containing the above instructions can be stored in a storage medium such as a magnetic disk, magneto-optical disc, and memory card; the program stored in the storage medium can be read out and loaded in computers and activated as needed. In addition, the program can be loaded in computers via communications networks and activated as needed; thereby, the program can be more easily upgraded in functions.

It will be obvious to those skilled in the art that various changes may be made in the above-described embodiments of the present invention. However, the scope of the present invention should be determined by the following claims.

What is claimed:

1. A navigation apparatus comprising:

a recording device configured to record a navigation program and user information about a user, the navigation program recorded in the recording device including destination region information about a destination region and version information about a version;

a reading device configured to read a navigation program stored in a portable storage medium, the navigation program stored in the portable storage medium including destination region about destination region and version information about a version; and a control circuit configured to execute a navigation function by reading and executing the navigation program recorded in the recording device, and to execute a program recording process and a backing up process, the program recording process and the backing up process being allowed to be performed in parallel, the program recording process reading the navigation program stored in the portable storage medium via the reading device and recording the read navigation program in the recording device, the backing up process backing up the user information recorded in the recording device, the control circuit further comprising:

a destination region comparison section configured to execute a destination region comparison to compare the destination region of the navigation program stored in the portable storage medium with the destination region of the navigation program recorded in the recording device, wherein, when the destination region of the navigation program stored in the portable storage medium is different from the destination region of the navigation program recorded in the recording device, the program recording process is executed while executing a user information easing process to erase the user information currently recorded in the recording device without executing the backing up process, a version comparison section configured to execute a version comparison to compare the version of the navigation program stored in the portable storage medium with the version of the navigation program recorded in the recording device when the destination region of the navigation program stored in the portable storage medium is identical to the destination region of the navigation program recorded in the recording device, wherein, when the version of the navigation program stored in the portable storage medium is newer than the version of the navigation program recorded in the recording device, the program recording process is executed while the backing up process is executed.

2. The navigation apparatus according to claim 1, wherein the user information includes point registration information which indicates a spot designated by the user as a departure point or an end point when executing a navigation process, the control circuit being further configured to execute an erasure to erase the contents data as the point registration information when executing the user information erasing process.

3. The navigation apparatus according to claim 1, wherein the user information includes user setting information, which indicates setting contents set up by the user against a default state with respect to functions including the navigation function,
the control circuit being further configured to execute an erasure to erase as the user information the recorded setting contents set up by the user while returning the setting information of the functions to the default state, when executing the user information erasing process.

4. The navigation apparatus according to claim 1, wherein the user information includes contents data registered by the user,
the control circuit being further configured to execute an erasure to erase the contents data as the user information when executing the user information erasing process.

5. The navigation apparatus according to claim 1, being mounted in a vehicle.

6. A method for recording a navigation program assigned with a destination region in a navigation apparatus the method comprising:
recording using a recording device included in the navigation apparatus the navigation program and user information about a user, the navigation program recorded in the recording device including destination region information about the destination region and version information about a version;
reading using a reading device included in the navigation apparatus a navigation program stored in a portable storage medium, the navigation program stored in the portable storage medium including destination region information about a destination region and version information about a version
executing using a control circuit included in the navigation apparatus a navigation function by reading and executing the navigation program recorded in the recording device, and that executes a program recording process and a backing up process, the program recording process and the backing up process being performed in parallel, the program recording process reading the navigation program in the portable storage medium via the reading device and recording the read navigation program in the recording device, the backing up process to back up the user information recorded in the recording device;
executing, in the navigation apparatus, a destination region determination as to whether the destination region of the navigation program stored in the portable storage medium is identical to the destination region of the navigation program recorded in the recording device;
executing, in the navigation apparatus, a version determination as to whether the version of the navigation program stored in the portable storage medium is newer than the version of the navigation program recorded in the recording device when it is determined that the destination region of the navigation program stored in the portable storage medium is identical to the destination region of the navigation program recorded in the recording device;
executing, in the navigation apparatus, the program recording process while executing a user information easing process to erase the user information currently recorded in the recording device without executing the backing up process, when it is determined that the destination region of the navigation program stored in the portable storage medium is not identical to the destination region of the navigation program recorded in the recording device; and
executing, in the navigation apparatus, the program recording process while executing the backing up process, when it is determined that the version of the navigation program stored in the portable storage medium is newer than the version of the navigation program recorded in the recording device.

7. The method according to claim 6, wherein the user information includes point registration information which indicates a spot designated by the user as a departure point or an end point when executing a navigation process, further comprising
executing, in the control circuit, an erasure to erase the contents data as the point registration information when executing the user information erasing process.

8. The method according to claim 6, wherein the user information includes user setting information, which indicates setting contents set up by the user against a default state with respect to functions including the navigation function, further comprising
executing, in the control circuit, an erasure to erase as the user information the recorded setting contents set up by the user while returning the setting information of the functions to the default state, when executing the user information erasing process.

9. The method according to claim 6, wherein the user information includes contents data registered by the user, further comprising
executing, in the control circuit, an erasure to erase the contents data as the user information when executing the user information erasing process.

10. The method according to claim 6, wherein the navigation apparatus is mounted in a vehicle while performing the steps.

11. A non-transitory computer-readable program storage medium comprising instructions being executed by a computer of a navigation apparatus, the instructions comprising:
recording using a recording device included in the navigation apparatus a navigation program and user information about a user, the navigation program recorded in the recording device including destination region information about a destination region and version information about a version;
reading using a reading device included in the navigation apparatus a navigation program stored in a portable storage medium, the navigation program stored in the portable storage medium including destination region information about a destination region and version information about a version;
executing using a control circuit included in the navigation apparatus a navigation function by reading and executing the navigation program recorded in the recording device, and that executes a program recording process and a backing up process, the program recording process and the backing up process being performed in parallel, the program recording process reading the navigation program in the portable storage medium via the reading device and recording the read navigation program in the recording device, the backing up process to back up the user information recorded in the recording device;
executing a destination region determination as to whether the destination region of the navigation program stored in the portable storage medium is identical to the destination region of the navigation program recorded in the recording device;
executing a version determination as to whether the version of the navigation program stored in the portable storage medium is newer than the version of the navigation program recorded in the recording device when it is determined that the destination region of the navigation program stored in the portable storage medium is identical to the destination region of the navigation program recorded in the recording device;

executing the program recording process while executing a user information easing process to erase the user information currently recorded in the recording device without executing the backing up process, when it is determined that the destination region of the navigation program stored in the portable storage medium is not identical to the destination region of the navigation program recorded in the recording device; and executing the program recording process while executing the backing up process, when it is determined that the version of the navigation program stored in the portable storage medium is newer than the version of the navigation program recorded in the recording device.

12. The non-transitory computer readable medium according to claim 11, wherein the user information includes point registration information which indicates a spot designated by the user as a departure point or an end point when executing a navigation process, further comprising executing, in the control circuit, an erasure to erase the contents data as the point registration information when executing the user information erasing process.

13. The non-transitory computer readable medium according to claim 11, wherein the user information includes user setting information, which indicates setting contents set up by the user against a default state with respect to functions including the navigation function, further comprising executing, in the control circuit, an erasure to erase as the user information the recorded setting contents set up by the user while returning the setting information of the functions to the default state, when executing the user information erasing process.

14. The non-transitory computer readable medium according to claim 11, wherein the user information includes contents data registered by the user, further comprising executing, in the control circuit, an erasure to erase the contents data as the user information when executing the user information erasing process.

15. The non-transitory computer readable medium according to claim 11, wherein the navigation apparatus is mounted in a vehicle while executing the instructions.

\* \* \* \* \*